Sept. 1, 1925.
C. A. PARSONS ET AL
1,551,844
GEAR TRAIN
Filed April 9, 1920    4 Sheets-Sheet 1
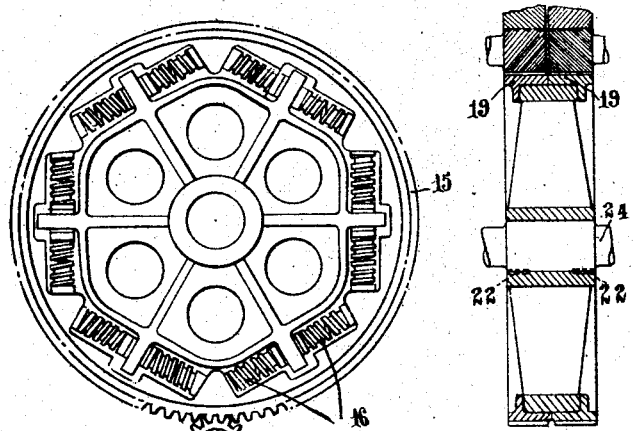
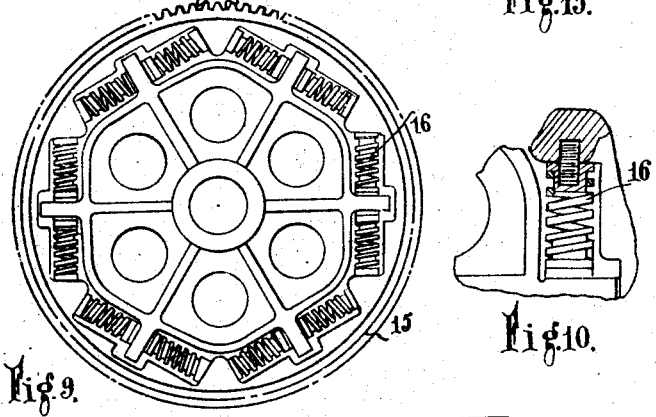
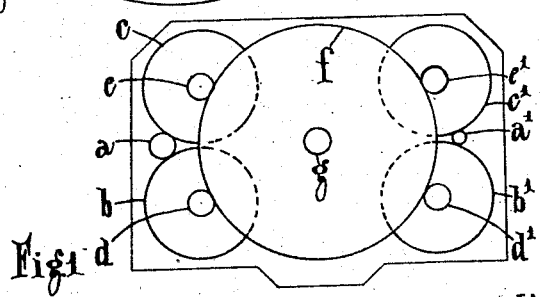
INVENTORS:
Charles A. Parsons,
Stanley S. Cook,
Louis M. Douglas.
by Spear, Middleton, Donaldson & Hall.
Attys.

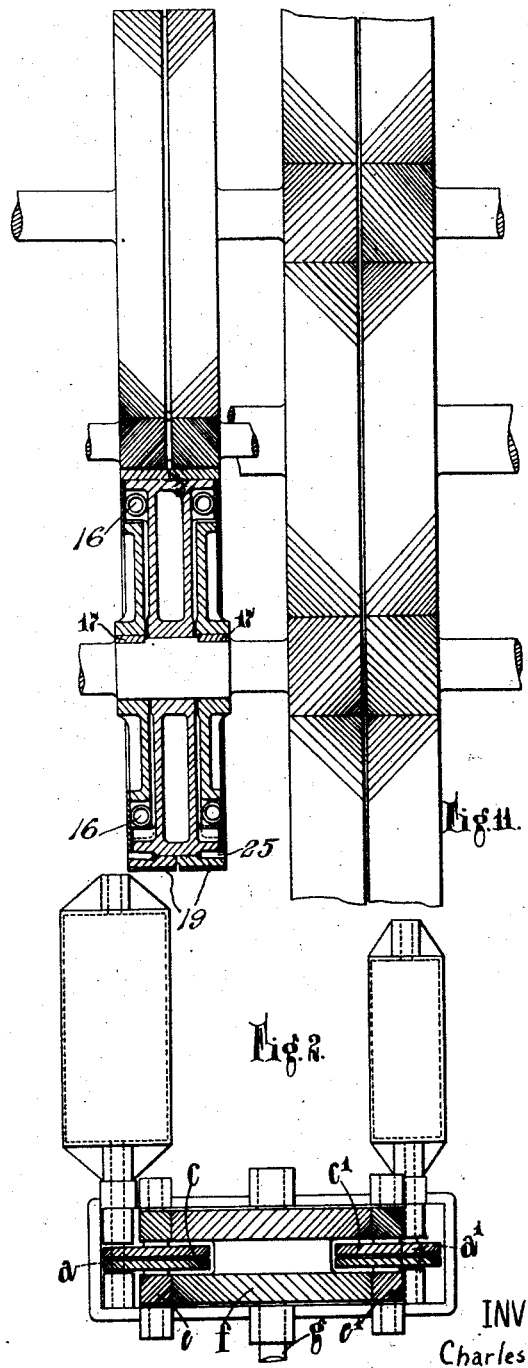

Sept. 1, 1925.                                              1,551,844
                      C. A. PARSONS ET AL
                          GEAR TRAIN
                    Filed April 9, 1920        4 Sheets-Sheet 3
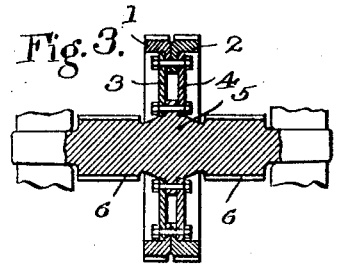
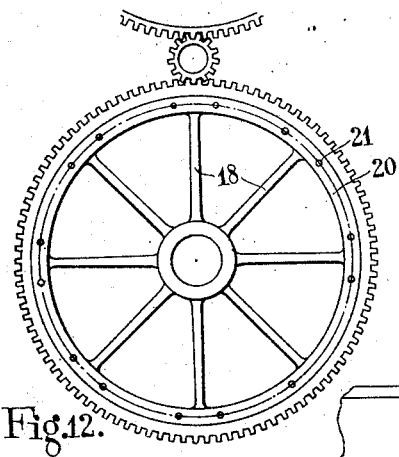
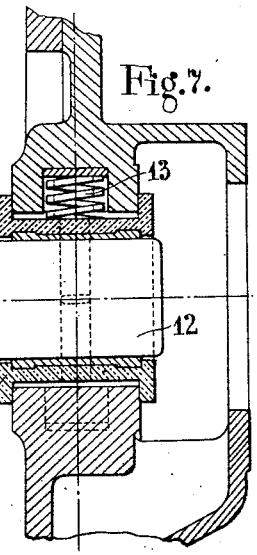
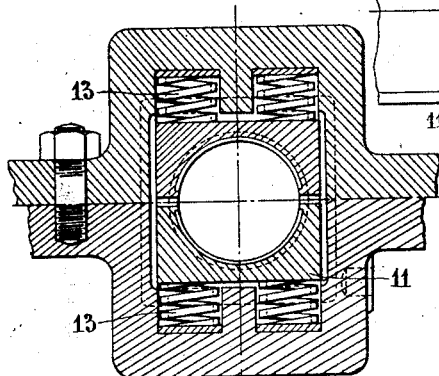
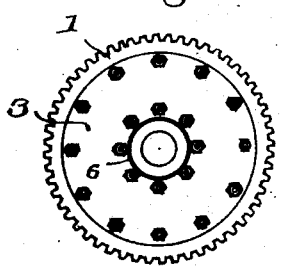
INVENTORS:
Charles A. Parsons,
Stanley S. Cook,
Louis M. Douglas.
by Spear, Middleton, Donaldson + Hall. Attys.

Sept. 1, 1925.                                                                1,551,844
C. A. PARSONS ET AL
GEAR TRAIN
Filed April 9, 1920                    4 Sheets-Sheet 4

INVENTORS:
Charles A. Parsons,
Stanley S. Cook,
Louis M. Douglas.

by Spear, Middleton, Donaldson & Hall
Attys.

Patented Sept. 1, 1925.

1,551,844

UNITED STATES PATENT OFFICE.

CHARLES ALGERNON PARSONS, STANLEY SMITH COOK, AND LOUIS MORTIMER DOUGLAS, OF NEWCASTLE-ON-TYNE, ENGLAND; SAID COOK AND SAID DOUGLAS ASSIGNORS TO SAID PARSONS.

GEAR TRAIN.

Application filed April 9, 1920. Serial No. 372,612.

*To all whom it may concern:*

Be it known that we, CHARLES ALGERNON PARSONS, STANLEY SMITH COOK, and LOUIS MORTIMER DOUGLAS, all subjects of the King of Great Britain and Ireland, and all residing at Heaton Works, Newcastle-on-Tyne, in the county of Northumberland, England, have invented certain new and useful Improvements in Gear Trains, of which the following is a specification.

The present invention relates to gear trains, especially to double-reduction gear trains whether of the single helical, double helical or spur type, in which each primary pinion drives two primary gear wheels mounted on intermediate shafts carrying secondary pinions which engage with the main gear wheel.

The object of the invention is to provide for adjustment of the gears so that the primary pinion transmits to the two primary wheels forces which are equal or in a desired ratio.

Since each of a pair of secondary pinions engages with the teeth of the same secondary gear wheel and each of the two primary gear wheels has to engage with the teeth of the same primary pinion, it is necessary, in order to ensure that the primary pinion is in proper contact with the teeth of, and drives equally through each intermediate shaft, to have a very exact relative circumferential disposition of the teeth of the various interengaging members of the train, and in cases where double helical teeth are employed it is also necessary to have a similarly exact relative longitudinal disposition of the members.

It is found to be practically impossible to cut the gears so accurately that these conditions are realized and a further object of the invention is to obviate this necessity of extreme accuracy in the cutting of the sets of teeth carried on the intermediate shafts of such a gear train in relation to each other.

The invention consists in the particular combinations of elements hereinafter described and particularly pointed out in the claims.

Referring to the accompanying drawings:—

Figure 1 is an elevation showing diagrammatically an installation to which the invention is to be applied.

Figure 2 is a plan of the same.

Figure 3 is a transverse section through one of the intermediate shafts.

Figure 4 is an end view of the same.

Figure 5:
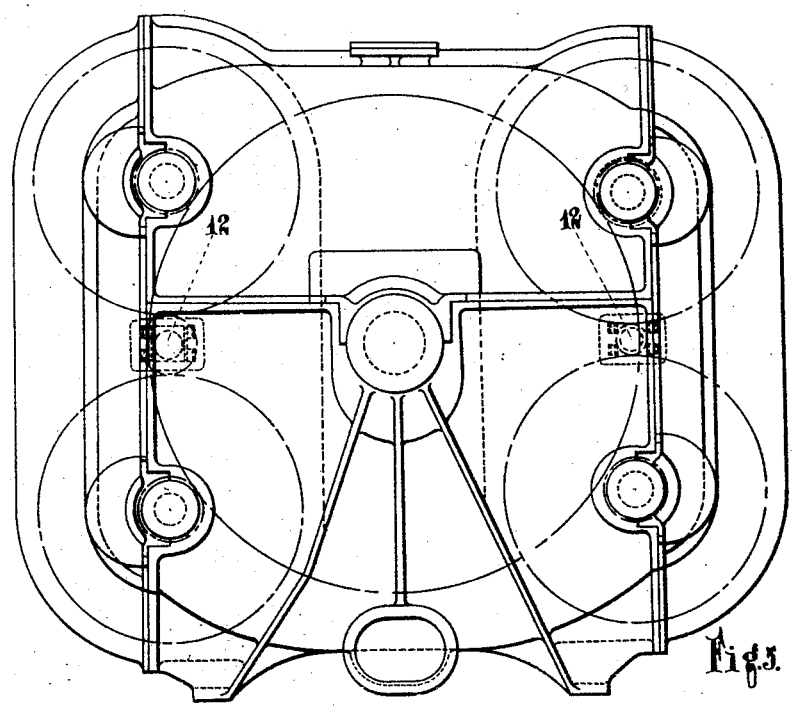
Figure 5 is an elevation.
Figure 6:
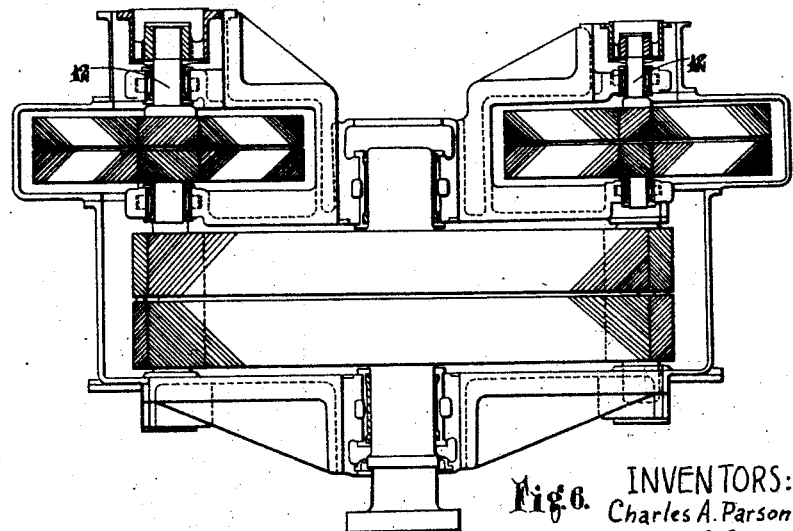

Figure 6 a plan of a modification in which the bearings are slidably mounted.

Figures 7 and 8 are enlarged sections at right angles showing the method of mounting the bearings.

Figure 9 shows a modification in which the primary gear wheels on the intermediate shafts are flexibly mounted.

Figure 10 shows a detail of the mounting.

Figure 11 is an elevation of the modification shown in Figure 9.

Figure 12 is an end view, and

Figure 13 a transverse section of a form of the invention in which both permanent and flexible adjustment is provided in the circumferential directions.

In carrying the invention into effect as illustrated in Figures 1–4 two primary pinions $a$ $a'$ are each arranged to drive two primary gear wheels $b$ $c$ $b'$ $c'$ mounted on intermediate shafts on which are also mounted secondary pinions $d$ $e$ $d'$ $e'$ which engage with the secondary gear wheel $f$ on the driven shaft $g$. One of the primary gear wheels is illustrated in Figures 3 and 4 and comprises two adjustable helices 1, 2, bolted to webs 3, 4, which are themselves bolted to a flange 5 on the intermediate shaft on which are cut the secondary pinion teeth 6, 6. In this case the gear train is assembled by mounting all the members in position and the first or last member of the train is then locked. Torque is then applied in the appropriate direction to the other members of the train including the two adjustable helices. The helices are constrained longitudinally but have circumferential freedom and they are each moved until each set of teeth is in proper contact when they are bolted to the webs, and dowel pins or other registering means fitted to retain them permanently in this position.

According to a modification separate permanent adjustment of each separate helix is provided as in the preceding example but the adjustments are made in the axial direction.

It will be seen that when the gears are double helical, by making each separate helix of a wheel separately adjustable, inaccuracies in both angular and axial directions are corrected by an adjustment in one of these directions only.

With a permanent adjustment as described above the major or first-degree inaccuracies of the gear train are provided for, but according to the present invention, in order to provide for the minor or second-degree inaccuracies and thereby secure continuously substantially equal power transmission through the two intermediate shafts, flexible or resilient means are used in addition to the permanent adjustment above described.

In the form of such resilient means shown in Figures 5 to 8, the bearings 11 which carry the primary pinion shafts 12 are slidably mounted so that they are capable of moving against the forces of retaining springs 13 which are initially compressed or extended. The motion thus allowed to the axis of the pinion is in a direction non-parallel with the common tangent to the faces of the interengaging teeth of the primary gears and preferably in a direction substantially at right angles to these common tangents or at right angles to the plane containing the axes of the two intermediate shafts. Dash pots, or any other known devices, may be provided to damp out oscillations.

According to another form of the resilient means, the drive is transmitted from each primary wheel to its shaft through spring devices such as are described in British patent specification No. 13019 of 1906.

This modification is shown in Figures 9, 10 and 11. Each primary wheel transmits force to its shaft with either direction of rotation through springs 16, which are initially free. One set of springs may be omitted however, so that when going astern the force is transmitted non-resiliently from the primary wheels to their shafts. The separate rims, 19 carrying the teeth, after setting the parts as described above, are permanently fixed in position by means such as the pins, 25.

In the form of the invention shown in Figures 12 and 13, in addition to the flexible adjustment provided by the thin webs or spokes 18 carrying the two helices 19, a permanent adjustment is provided by bolting each of these helices in its correct circumferential position relatively to the rim 20 by means of bolts 21. In this case the wheel with the flexible spokes is keyed by keys 22 to the intermediate shaft 24. In the examples illustrated the permanent adjustment has been made on the primary gear wheels because of the relatively small faces of these wheels and of the convenience of their dimensions for adjustment. The adjustment can, however, be made on the secondary pinion.

Having now described our invention, what we claim as new and desire to secure by Letters Patent is:—

1. In combination in a gear train, a driving pinion and a main driven gear, and a plurality of gear drives between them, each of said gear drives including a shaft carrying a set of pinions and a set of primary gears, the members of one of said sets being relatively adjustable circumferentially with means for holding them relatively fixed in their adjusted position, whereby major inaccuracies may be eliminated, and resilient means associated with the gear train whereby minor inaccuracies may be automatically compensated for, the members of the gear sets being non-flexible laterally, substantially as described.

2. In combination in a gear train a driving pinion in right and left helical sections, a main driven gear in right and left helical sections, and a plurality of gear drives between the pinion and driven gear, each made up of a primary gear in right and left helical sections and a secondary pinion in right and left helical sections, means for relatively adjusting the helical sections circumferentially and setting them in a new fixed relation to eliminate major inaccuracies, and resilient means associated with the gear train for compensating for minor inaccuracies, all of the sections being non-flexible laterally, substantially as described.

In testimony whereof we have signed our names to this specification.

CHARLES ALGERNON PARSONS.
STANLEY SMITH COOK.
LOUIS MORTIMER DOUGLAS.